United States Patent Office 3,625,680
Patented Dec. 7, 1971

1

3,625,680
METHOD FOR PRODUCING POROUS URANIUM
Joseph J. Asbury, Knoxville, Tenn., assignor to the United
States of America as represented by the United States
Atomic Energy Commission
No Drawing. Filed Oct. 29, 1968, Ser. No. 771,633
Int. Cl. B22f 1/00
U.S. Cl. 75—222                                    4 Claims

ABSTRACT OF THE DISCLOSURE

High-purity porous uranium articles are produced by preparing an admixture of particulate calcium oxide, magnesium metal, and uranium; pressing the mixture into a compact; sintering the compact in an inert atmosphere; and thereafter contacting the compact with acid solutions for removing the calcium oxide, magnesium, magnesium oxide, and uranium oxide.

---

The present invention relates generally to porous uranium and more particularly to a method for producing high-purity uranium of selective densities in the range of about 30 to 77 percent of theoretical density. This invention was made in the course of, or under, a contract with the U.S. Atomic Energy Commission.

Porous metals are normally prepared by employing sintering techniques wherein the particle size of the metal powder being sintered or pressures used to form the compacts are controlling factors in the final density of the porous metal. Volatile pore formers such as camphor and the like are also employed in combination with such sintering techniques for further increasing the porosity. While these previously known methods have enjoyed success with many metals, they have not been satisfactory for the preparation of porous uranium of high purity in a density range of about 30 to 77 percent of theoretical density, which is 19.12 g./cc. Pressureless sintering of uranium powder without the aid of a pore former resulted in porous uranium possessing densities at and above the high end of the desired range, i.e., at least about 77 percent of theoretical density, as well as insufficient strength between the bonded uranium particles due to the presence of oxygen on the surface of the powder. The use of a pore former to increase the porosity of the porous uranium presented a considerable problem since the pore former, to be satisfactory, must necessarily provide a combination of features including uniform dispersion of the uranium particles in the mixture, no metallurgical or chemical reaction with the uranium metal, and efficient removal from the sintered uranium powder so as to provide a uniformly porous uranium body of a purity at least as great as the starting material. The pore formers previously employed in the production of porous metals have not been acceptable in the production of porous uranium since they each failed to provide at least one of the pore former requirements set forth above.

The present invention has for its primary objective the production of high-purity porous uranium which is accomplished by employing a sintering process wherein particulate calcium oxide is used as the pore former and a sintering aid such as particulate magnesium metal or calcium is used to remove oxygen from the surface of the uranium particles for facilitating uranium particle bonding during sintering. The calcium oxide readily fulfills each of the above requirements demanded of the pore former.

Another object of the present invention is to provide porous uranium products of densities in a range of 30 to 77 percent of theoretical density.

A further object of the present invention is to provide uranium articles of uniform and open porosity and of a purity at least as great as the purity of the uranium starting material.

Other and further objects of the invention will be obvious upon an understanding of the illustrative description below, or will be indicated in the appended claims, and various advantages not referred to herein will occur to one skilled in the art upon employment of the invention in practice.

Described generally, the present invention relates to a unique method of producing high-purity, low-density uranium products having uniform pore size, uniform porosity, and a density in the range of about 30 to about 77 percent of theoretical density. The method of this invention comprises the production of porous uranium products by preparing an admixture of uranium powder, calcium oxide, and a sintering aid such as magnesium metal. The admixture is pressed into a compact of a desired configuration and thereafter sintered in an inert atmosphere, e.g., argon, at a temperature sufficient to effect bonding between the uranium particulates. After sintering, the compact is contacted with acid solutions to remove or leach from the compact the calcium oxide, magnesium oxide, any remaining magnesium metal, and uranium oxide. The calcium oxide functions as a pore former for providing uranium products in the above-described density range, while the magnesium metal is employed for the purpose of reducing oxygen on the surface of the uranium powder and thereby enhancing the bonding between adjacent uranium particles during the sintering step.

The uranium from which the porous products are prepared may vary in purity from substantially pure uranium, i.e., uranium containing impurities amounting to less than about 100 p.p.m., to uranium alloys such as uranium-molybdenum, uranium-zirconium, and uranium-niobium, or uranium containing considerable quantities of impurities such as iron and oxygen. Care should be exercised in employing some uranium alloys since the acid solutions used in the leaching steps may attack alloy constituents and thereby detract from the desired product. The particle size of the uranium is preferably about 10 microns, but may be of any commercially available size which is sinterable.

The calcium oxide pore former, when admixed with the particulate uranium, effects uniform dispersion of the uranium particles in the mixture to assure the formation of a uniformly porous uranium product exhibiting open porosity. Also, since the calcium oxide does not react metallurgically or chemically with the uranium metal or the magnesium metal during any step of the disclosed method up to and including the sintering operation and does not volatilize at the sintering temperatures employed, the uranium product is not contaminated by any reaction and volatilization products. Upon completing the sintering operation, the calcium oxide is preferably removed from the sintered uranium matrix by contacting the latter with a dilute solution of acetic acid. If desired, dilute solutions of other acids such as nitric, sulfuric, and hydrochloric may be used to leach the calcium oxide and the sintering aid from the compact, but some dissolution of the uranium particles at the edges of the pores may occur.

The porosity of the uranium product is readily controlled by the quantity of calcium oxide employed in the mixture. For example, uranium products of about 77 percent theoretical density are prepared by using about 4 grams calcium oxide powder for every 100 grams uranium powder, while products of about 30 percent theoretical density require about 38 grams calcium oxide powder for every 100 grams uranium powder. The relationship of this quantity of calcium oxide powder and uranium powder to the density of the product is computed on the basis of the densities of the various mixture ingredients and includes 5 percent magnesium powder. The size of the pores in the uranium product is regulated by the particle size of the calcium oxide powder. Normally, calcium oxide powder of a uniform particle size of about 40 microns provides a porous uranium product having a pore size of sufficient dimensions for most applications, but, if desired, particle sizes of as little as 10 microns or as large as 100 microns or greater may be readily employed. Also, if desired, calcium oxide particles of various preselected sizes may be employed in the preparation of a single uranium product.

In order to enhance the sintering of the uranium particles a suitable oxygen getter or sintering aid is preferably employed. Magnesium or calcium provides a suitable oxygen getter because of their activity with oxygen at elevated temperatures. Thus, the use of magnesium metal or calcium in the present method is desirable for the formation of the bond between the uranium particulates since these metals readily react with the oxygen on the surface of the uranium and interstitial oxygen to form magnesium oxide or calcium oxide. The quantity of magnesium metal or calcium employed in the admixture is relatively small, normally in the order of 5 percent. However, if the uranium starting material contains considerable quantities of surface oxygen, a greater quantity of the oxygen getters may be readily employed. The oxygen getters are readily leached from the sintered compact by acetic acid or other acids such as mentioned above and do not adversely react with the uranium or the calcium oxide at or below the sintering temperature. The uranium-calcium oxide-magnesium or calcium mixture is preferably pressed into a compact of desirable configuration by employing an isostatic pressing operation which may be effected at a suitable pressure of about 22,500 p.s.i. Other forms of pressing such as die pressing may be employed, but it has been found that porous uranium products exhibiting the more desirable properties are prepared from uniformly pressed compacts.

The pressureless sintering of the compact is achieved in a somewhat conventional manner by confining the compact in an inert atmosphere such as argon and then subjecting the compact to temperatures up to about 1100° C. Lower sintering temperatures may be utilized when uranium alloys are employed, since the melting points of some of these alloys are substantially lower than uranium. For example, with the employment of uranium-238 powder with major impurities of 2820 p.p.m. oxygen and 1500 p.p.m. iron, the sintering temperature is about 780° C. since the uranium-iron alloy has a lower melting point than uranium. The duration of sintering may vary from product to product, but is normally about 4 hours.

In order to evacuate the pore sites in the sintered compact as well as remove the sintering aid and other contaminants from the compact the latter is contacted with acid solutions which effectively remove the magnesium oxide or calcium oxide resulting from the reaction of the oxygen getter with the oxygen in the mixture, the calcium oxide, the uranium oxide, and any remaining magnesium metal or calcium. The acid solutions found suitable for this operation are preferably a dilute acetic acid and a dilute nitric acid solution. Satisfactory results have been achieved by using acetic acid and nitric acid in concentrations of 1:4 by volume and 1:9 by volume, respectively. The acetic acid effectively removes the calcium oxide, magnesium, and magnesium oxide from the sintered compact. With an acetic acid solution in the above concentration the removal of these materials is normally effected in about 4 hours, but with more or less concentrated solutions the leaching duration will vary. The uranium oxide in the sintered compact may be readily removed by the nitric acid in the above concentration in a period of about 10 minutes.

In order to provide a more facile understanding of the present invention typical productions of porous uranium-238 products are described below. In these examples the uranium-238 powder had an average particle size of 10 microns and major impurities of 2820 p.p.m. oxygen and 1500 p.p.m. iron.

EXAMPLE I

A porous uranium disc of 60 percent theoretical density was produced by admixing 459 grams of uranium powder, 3.5 grams of magnesium powder, and 47 grams of calcium oxide. This mixing was achieved in an inert argon atmosphere to prevent contaminants, particularly oxygen, from entering the mixture. The mixture was isostatically pressed at 22,500 p.s.i. at room temperature. The compact was removed from the pressing mechanism and pressureless sintered at 780° C. for 4 hours in an argon atmosphere. The sintered compact was then leached in acetic acid diluted 1:4 by volume for 4 hours to remove the calcium oxide, magnesium oxide, and any unreacted magnesium metal. The compact was then leached in nitric acid diluted 1:9 by volume to remove the uranium oxide. The uniformly porous product had a purity greater than the initial uranium starting material since a significant percentage of the oxygen impurity in the uranium was removed by the magnesium.

EXAMPLE II

A porous uranium product of 30 percent theoretical density was prepared in a manner similar to that in Example I except for using 220 grams of uranium powder and 87 grams of calcium oxide. The use of the greater quantity of calcium oxide decreased the density of the porous uranium product, but did not decrease the purity thereof.

It will be seen that the present invention provides a unique method for producing porous uranium which may be advantageously employed as an oxygen getter in the purification of sodium and sodium-potassium alloys. Removal of the oxygen by employing the porous uranium of the present invention is significantly more efficient than the powdered uranium previously employed because of the larger exposed surface areas provided by the porous uranium. Another advantage afforded by the present invention is enhanced machinability since, after sintering, the pore former and sintering aid remain in the compact to provide the latter with greater structural integrity for machining purposes. Upon machining the compact into an article of desired dimensions the pore former and sintering aid may be readily removed.

As various changes may be made in the sintering aids, acids used in the leaching operation, pressing methods, and the arrangement of the method steps herein without departing from the spirit and scope of the invention and without sacrificing any of its advantages, it is to be understood that all matter herein is to be interpreted as illustrative and not in a limiting sense.

What is claimed is:

1. A method of producing a porous uranium article of a density in the range of about 30 to 77 percent of theoretical density, comprising the steps of mixing particulate uranium metal with a particulate pore former consisting essentially of calcium oxide in a quantity adequate to provide the uranium article with sufficient porosity to be in said range, pressing the mixture into a compact of a desired configuration, heating the compact in an inert atmosphere to a temperature sufficient to effect sintering of the particulate uranium metal, and thereafter contacting the compact with an acid solution selected from the group of acids consisting of acetic, nitric, sulfuric, and hydrochloric for leaching the calcium oxide from the sintered compact.

2. The method claimed in claim 1, wherein a material selected from the group consisting of calcium and magnesium is admixed with said mixture prior to the pressing step, said material is in particulate form and of a quantity adequate to getter sufficient oxygen from said mixture to facilitate the sintering of the particulate uranium metal and wherein oxides resulting from the gettering of oxygen and any remaining quantity of said material are removed from the compact by said acid solution during the leaching step.

3. The method claimed in claim 2, wherein said quantity of calcium oxide is in a range of about 38 to about 4 grams per 100 grams of uranium metal.

4. The method claimed in claim 1, including the additional step of contacting the sintered compact with a nitric acid solution for leaching uranium oxide from the compact when an acid solution from said group other than nitric acid is selected for the step of leaching the calcium oxide from the sintered compact.

References Cited

UNITED STATES PATENTS

| | | | |
|---|---|---|---|
| 2,462,045 | 2/1949 | Wulff | 75—200 |
| 2,540,233 | 2/1951 | Beaver | 75—222 |
| 2,968,551 | 1/1961 | North et al. | 264—.5 |
| 3,007,822 | 11/1961 | Kaiser et al. | 75—200 |
| 3,183,086 | 5/1965 | Kurtz et al. | 75—200 |
| 3,219,730 | 11/1965 | Bliton et al. | 264—.5 |
| 3,377,141 | 4/1968 | Hardy et al. | 264—.5 |
| 3,419,387 | 12/1968 | Gordon et al. | 264—.5 |
| 2,805,473 | 9/1957 | Handwerk et al. | 75—206 |
| 2,782,117 | 2/1957 | Wilhelm et al. | 75—84.1 |

OTHER REFERENCES

Goetzel, Treatise on Powder Metallurgy, vol. I, 1949, pp. 68, 69, 166.

Hausner, Powder Metallurgy in Nuclear Engineering, 1958, pp. 33, 35.

CARL D. QUARFORTH, Primary Examiner

B. H. HUNT, Assistant Examiner

U.S. Cl. X.R.

75—200; 252—301.1 R; 264—0.5